United States Patent [19]

Amlinger

[11] Patent Number: 4,838,912
[45] Date of Patent: Jun. 13, 1989

[54] METHOD AND APPARATUS FOR THE PURIFICATION AND RECIRCULATION OF GASES

[75] Inventor: Heinrich Amlinger, Niddatal, Fed. Rep. of Germany

[73] Assignee: Leybold AG, Hanau, Fed. Rep. of Germany

[21] Appl. No.: 226,528

[22] Filed: Jul. 28, 1988

Related U.S. Application Data

[63] Continuation of Ser. No. 92,460, Sep. 3, 1987, abandoned.

[30] Foreign Application Priority Data

Sep. 5, 1986 [EP] European Pat. Off. ........ 86112317.2

[51] Int. Cl.$^4$ .................................. F25J 1/00
[52] U.S. Cl. ............................. 62/9; 62/36; 62/52.1; 62/54.1; 264/12; 425/7
[58] Field of Search ............. 425/7; 264/12; 62/9, 62/54, 36, 52

[56] References Cited

U.S. PATENT DOCUMENTS

| | | | |
|---|---|---|---|
| 3,273,349 | 9/1966 | Litvin et al. | 62/54 |
| 4,575,386 | 3/1986 | Hamers | 62/54 |
| 4,629,407 | 12/1986 | Amlinger | 425/7 |

Primary Examiner—Ronald C. Capossela
Attorney, Agent, or Firm—Kenyon & Kenyon

[57] ABSTRACT

The invention relates to a method and apparatus for the purification and recirculation of gases which are fed to a plant for the production of metal powder or for compacting metal powder at elevated pressures. The operating gas exits the plant at a lower pressure and is conveyed in a closed loop, in which filters are provided for the mechanical and/or chemical purification of the gases as well as means for increasing the pressure of the purified gas. The repressurization of the operating gas is carried out economically by liquefying the operating gas leaving the plant after purification by the application of liquid nitrogen, then feeding the liquefied gas to an evaporator via a high-pressure pump, and finally returning the operating gas to the plant in a pressurized gaseous phase.

13 Claims, 1 Drawing Sheet

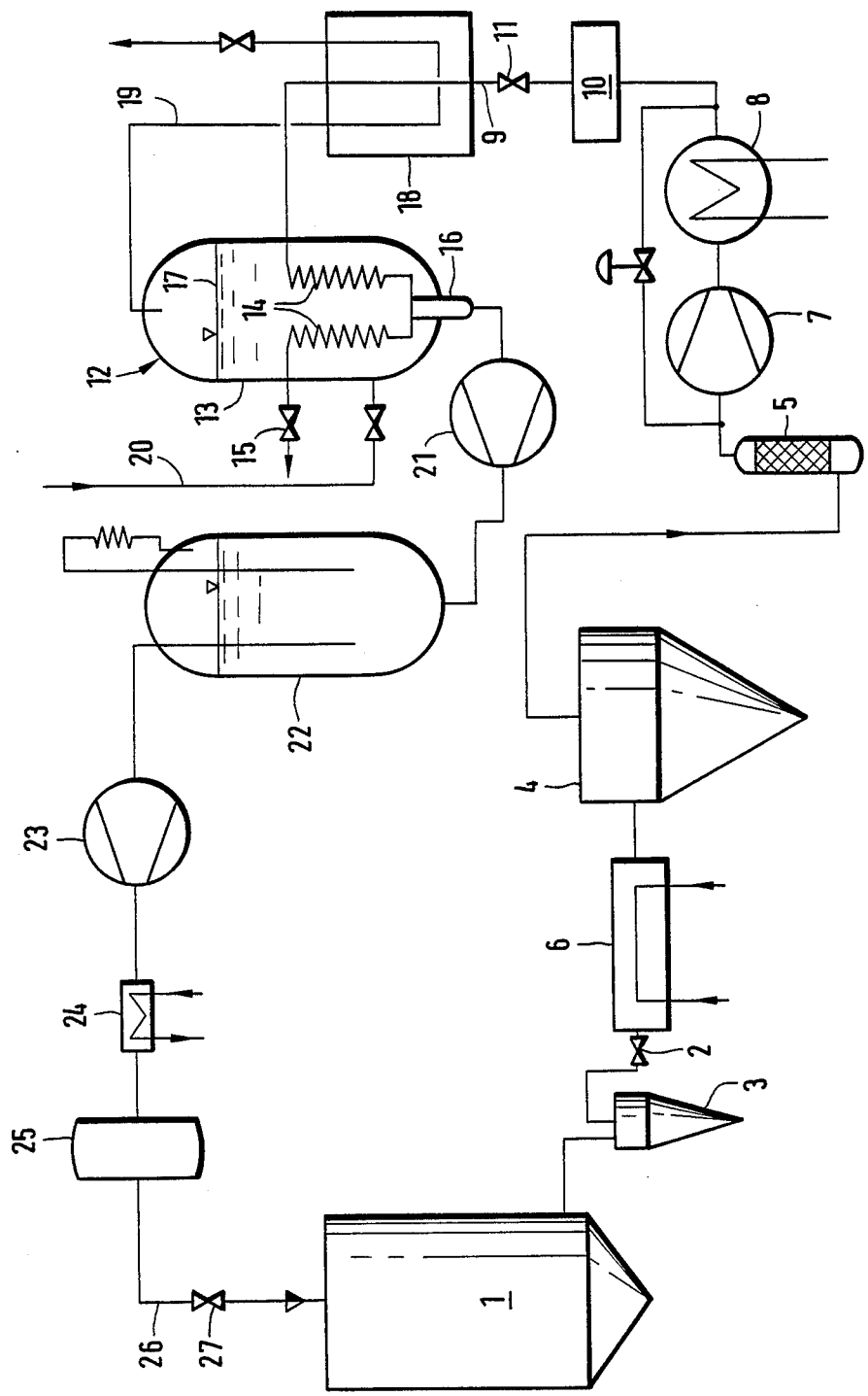

METHOD AND APPARATUS FOR THE PURIFICATION AND RECIRCULATION OF GASES

This application is a continuation of application Ser. No. 092,460, filed Sept. 3, 1987, now expressly abandoned.

BACKGROUND OF THE INVENTION

The invention relates to a method for the purification and recirculation of gases which are fed to a process plant, preferably a plant for the production of metal powder or a plant for compacting metal powder under elevated pressure.

The gases exiting the plant are at a reduced pressure and are conveyed in a closed loop of filters and pressurizing means for the mechanical and/or chemical purification of the gases as well as for repressurization. In addition, the invention relates to an apparatus suitable for carrying out this method. Adsorbers and reactors for the mechanical and chemical purification of the gases may be provided as filters.

U.S. Pat. No. 4,629,407 discloses a plant for the production of metal powder which is equipped with a gas recycling system. In order to raise the purified gases to the required pressure for atomizing the metal powder (between 8 and 160 bar), a multi-stage compressor is required. The cost for this compressor is quite high as far as investment and operating costs are concerned, especially if the gases to be purified and recirculated must be brought to pressures which exceed 40 bar.

OBJECT AND SUMMARY OF THE INVENTION

It is an object of the present invention to provide an improved method for the purification and recirculation of process gases and an apparatus suitable for carrying out the method which is inexpensive as far as investment costs are concerned.

In the process according to the present invention, the recirculating gas exiting the plant is filtered or purified, then liquefied by the application of liquid nitrogen. The liquefied gas is then fed to an evaporator by a high-pressure pump where it is changed into the gaseous phase and returned to the plant. The plant, according to the invention, no longer requires the cost of a multi-stage compressor. For liquefying the gas liquid nitrogen is used as the refrigerant which is readily available and inexpensive. While the plant, according to the invention, has higher operating costs than a plant utilizing compressors, it operates substantially faster profitable since the cost ratio of liquid nitrogen to the process gas, e.g. argon, is approximately 1 to 8, as calculated on a gas basis, i.e. 0.84 kg of liquid nitrogen are required for liquefying 1 kg of argon.

For liquefying argon it is advantageous to keep the liquid nitrogen as a refrigerant in a liquefying device at a pressure above atmospheric pressure, preferably about 3 bar. At this pressure, liquid nitrogen has a boiling point of about 88° K. This temperature is above the solidification point of argon which is 84° K. while argon is liquefied at a temperature of at least 90° to 97° K. At these temperatures, a liquefication pressure of about 1.3 to 2.5 bar is required. At a liquid nitrogen temperature of 88° K., it is assured that the pressure does not drop below atmospheric pressure during the liquefication of the argon. Thus, the inlet pressure for the subsequent argon pump is always above 1 bar (abs), and no evaporation or cavitation occurs in the pump.

Further advantages and details of the invention will be explained by reference to one embodiment of the invention shown schematically in the drawing.

BRIEF DESCRIPTION OF THE DRAWING

The drawing is an elevational schematic of the process of the present invention shown in a metal powder production plant.

DESCRIPTION OF THE PREFERRED EMBODIMENT

In the illustrated embodiment, the method of the present invention can be performed in a plant, to which an operating gas can be fed at high pressure and from which the gas emerges at a reduced pressure. The plant may, for instance, be a tower which serves for atomizing liquid metal for the production of a metal powder, or it may be an isostatic powder press. In the production of metal powder, high-pressure gas (between 8 and 160 bar) is introduced via a nozzle (not shown) which is located in the tower 1. In the nozzle, a melt dripping down is atomized with the gas. The heat of melting from the melt is given off to the gas in this process. As will be appreciated atomizing plants of this type are commercially known to those of ordinary skill in this art.

The hot gas which is loaded with metal powder impurities exits the tower 1 and flows into a filter system which consists of a cyclone 3, a cyclone bag filter 4 as well as a fine filter 5. Between the first cyclone 3 and filter 4 a valve 2 and a gas cooler 6 are located. The above described components 2 to 6 must be adapted to the plant 1 in question as required. It is essential that the operating gas, preferably argon in the case of metal atomizing plants, is free of dust after it leaves the fines filter 5.

The fines filter 5 is followed by a compression device 7 wherein the gas is elevated to a pressure greater than 1.3 bar. The compression device 7 is advantageously designed as a single-stage or two-stage Roots blower. The blower 7 is followed by the cooler 8 for removing the heat of compression.

The operating gas is transported to a liquefier 12 via line 9 through valve 11. Optimally, a gas purifier 10 can be connected in line 9 to remove impurities such as $O_2$, $CO_2$, CO, $H_2$, $H_2O$, $N_2$. The description of such a purifier is found in U.S. Pat. No. 4,629,407, incorporated herein by reference.

The liquefier 12 comprises a liquefacient insert 14 located in a tank 13, the lower end of which leads to a collecting vessel 16. Liquid nitrogen is contained in the liquefier 12 and the liquid nitrogen level 17 is controlled by a level control (not shown) in such a manner that the liquefacient insert 14 is below the surface of the liquid. In order to prevent noncondensable gases from interfering with the liquefaction, a small portion of the argon to be liquefied is drawn-off with noncondensable components from the liquefier 12 to the atmosphere via valve 15.

The liquefier 12 is preceded by a cooler 18, through which operating gas line 9 and nitrogen line 19 are brought. Nitrogen evaporating in the liquefier 12 is removed through line 19. In cooler 18, the cold nitrogen cools the argon to be liquefied which flows through line 9 before it enters the liquefacient insert 14. A line 20 serves to feed the liquid nitrogen into the liquefier 12.

Liquefied gas is transported from the collecting tank 16 into a supply tank 22 by means of a pump 21. The pump 21 is designed as a centrifugal or reciprocating pump and is switched on only if the liquefied gas in the supply tank 16 exceeds a selected level. The supply tank 22 is maintained at elevated pressures, for example, 5 bar.

The liquefied operating gas is removed from the supply tank 22 by means of a high-pressure pump 23, elevated to the proper pressure, then fed to an evaporator 24. The liquefied operating gas is converted into a high pressure gas in evaporator 24 then stored in a tank 25 at the desired pressure. The gas is recycled to the plant 1 via line 26 through valve 27.

To ensure the operation of the pump 21 when argon is the operating gas, the pressure in the collecting tank 16 must not fall below atmospheric pressure. It is advantageous that a slight overpressure, i.e. a pressure between 1 and 1.5 bar (abs), prevail at this point. This assumes argon temperatures of about 87° to 91° K. Since liquid nitrogen has a temperature of about 77° K. at atmospheric pressure, the mentioned temperatures in the region of the collecting tank 16 can be obtained only if the nitrogen bath is under pressure, so that the boiling point is shifted to higher temperatures. An advantageous temperature has been found to be 88° K. if a temperature of about 91° K. is to prevail in the collecting tank 16. The liquid nitrogen in the tank 13 assumes a temperature of about 88° K. if the nitrogen bath is at a pressure of about 3 bar. Control mechanisms which assure the maintenance of this pressure and the pressure in the liquefacient insert 14 of the liquefier 12, are known in detail and are therefore not shown.

The invention in its broader aspects is not limited to the specific described embodiments and examples and departures may be made therefrom within the scope of the accompanying claims without departing from the principles of the invention and without sacrificing its chief advantages.

What is claimed is:

1. A method for purifying and recirculating operating gases in a plant for producing or compacting metal powder, the operating gases entering the plant at high pressure and exiting the plant at reduced pressure, the method comprising:
    filtering the operating gas after it exits the plant to purify it;
    compressing the gas after the gas is filtered;
    liquifying the gas after compression by applying liquid nitrogen;
    converting the liquid into a high pressure gas; and
    reintroducing the filtered, high-pressure gas into the plant.

2. The method of claim 1, wherein the gas is liquified by means of a low temperature liquefier with a liquefier insert which uses liquid nitrogen, the pressure within the insert being at least 1.3 bar and the pressure of said liquefier being at least 1.2 bar.

3. The method of claim 2, wherein the pressure within the liquefier is in the range of 1.3 to 2.5 bar.

4. The method of claim 1, wherein argon is the operating gas.

5. The method of claim 2, wherein argon is the operating gas.

6. The method of claim 2, wherein the liquid nitrogen in the liquefier is maintained at a pressure above atmospheric pressure.

7. The method of claim 2, wherein the liquid nitrogen in the liquefier is maintained at a pressure of 3 bar.

8. The method of claim 1, wherein the step of converting the liquid into a high pressure gas comprises:
    storing the liquid in a storage tank maintained at an elevated pressure;
    conveying the liquid to an evaporator by means of a pump; and
    using the evaporator to convert the liquid into a gas.

9. An apparatus for purifying and recirculating an operating gas in a plant for producing or compacting metal powder, the operating gas entering the plant at high pressure and exiting the plant at reduced pressure, comprising:
    intake means coupled to the plant for intaking low pressure operating gas;
    filtration means coupled to the intake means for filtering the operating gas;
    liquefier means coupled to the filtration means for liquifying the operating gas;
    evaporation and compression means coupled to the liquefier means for converting the liquid operating gas to a gas and compressing it; and
    exhaust means coupled to the evaporation and compressor means for returning the operating gas to the plant.

10. The apparatus of claim 9, wherein liquid nitrogen is used to liquify the operating gas in the liquefier means.

11. The apparatus of claim 10, further comprising a cooler means coupled to the filtration and liquefier means wherein heat exchange between the operating gas to be liquified and gaseous nitrogen emitted from the liquefier occurs.

12. The apparatus of claim 11, further comprising storage tank means coupled to the liquefier means and the evaporation and compression means for storing the liquid operating gas, the storage tank being maintained at an elevated pressure.

13. The apparatus of claim 12 further comprising a first pump means coupled to the liquefier means and the storage tank means for conveying the liquid operating gas from the liquefier means to the storage tank means and a second pump means coupled to the storage tank means and the evaporation and compression means for conveying liquid operating gas from the storage tank means to the evaporation and compression means.

* * * * *